No. 665,276. Patented Jan. 1, 1901.
L. F. SHROPSHIRE & W. C. RIGGIN.
ATTACHMENT FOR OYSTER DREDGES.
(Application filed Oct. 11, 1900.)
(No Model.) 2 Sheets—Sheet 1.
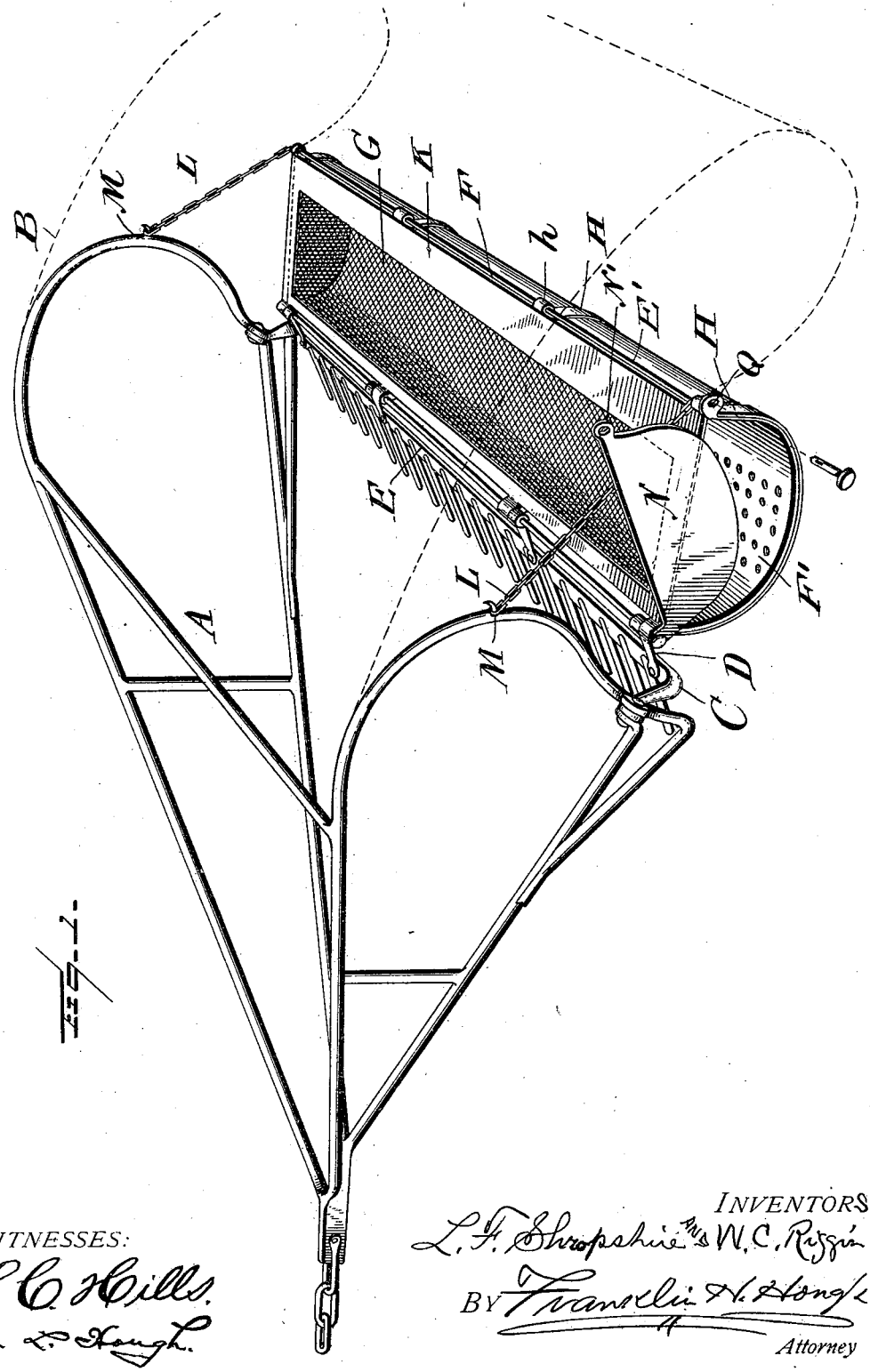

No. 665,276. Patented Jan. 1, 1901.
L. F. SHROPSHIRE & W. C. RIGGIN.
ATTACHMENT FOR OYSTER DREDGES.
(Application filed Oct. 11, 1900.)
(No Model.) 2 Sheets—Sheet 2.
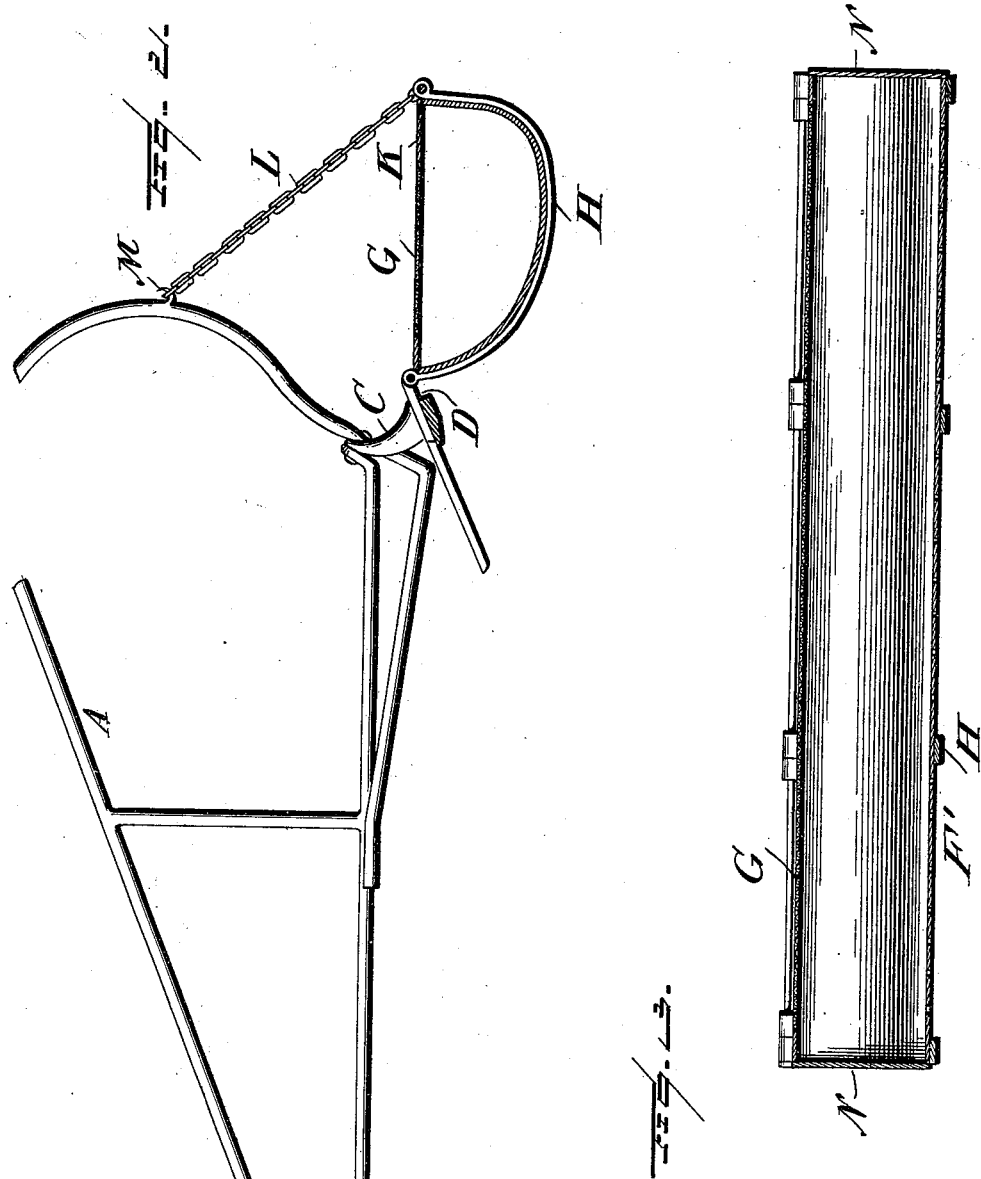
WITNESSES:
INVENTORS
L. F. Shropshire
W. C. Riggin
BY Franklin N. Hough
Attorney

UNITED STATES PATENT OFFICE.

LEWIS F. SHROPSHIRE AND WALTER C. RIGGIN, OF PORT NORRIS, NEW JERSEY.

ATTACHMENT FOR OYSTER-DREDGES.

SPECIFICATION forming part of Letters Patent No. 665,276, dated January 1, 1901.

Application filed October 11, 1900. Serial No. 32,773. (No model.)

*To all whom it may concern:*

Be it known that we, LEWIS F. SHROPSHIRE and WALTER C. RIGGIN, citizens of the United States, residing at Port Norris, in the county of Cumberland and State of New Jersey, have invented certain new and useful Improvements in Attachments for Oyster-Dredges; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in oyster-dredge attachments, and especially to a device adapted to be connected to an ordinary oyster-dredge for the purpose of gathering the "borers" or shell-fish which are detrimental to oyster culture on account of the fish attacking the shell of the oyster and perforating the shell, thus causing the death of quantities of oysters; and in carrying out our invention we propose to hinge to the dredge a swinging trough-shaped receptacle which is covered with a wire-netting of sufficiently large mesh to allow the small obnoxious shell-fish to pass through the same into the receptacle as the oysters and shell-fish are dredged up from the oyster-beds, the mesh of the screen covering the receptacle being too small to allow the oysters to pass through, the latter being caught in the chain basket commonly employed as a part of the dredge.

The invention relates, further, to various details of construction, which will be hereinafter more fully described and then specifically defined in the appended claims.

Our invention is clearly illustrated in the accompanying drawings, which, with the letters of reference marked thereon, form part of this application, and in which drawings similar letters of reference indicate like parts throughout the several views, in which—

Figure 1 is a perspective view of an ordinary oyster-dredge, showing our improved attachment hinged thereto. Fig. 2 is a cross-sectional view through our improved attachment for oyster-dredges, the dredge to which it is connected being shown in side elevation; and Fig. 3 is a central longitudinal vertical section through the dredge attachment.

Reference now being had to the details of the drawings by letter, A designates a dredge of ordinary construction which has connected thereto, as shown in dotted lines in Fig. 1 of the drawings, a wire basket B for receiving the oysters, and to the flat rake-carrying bar C are secured the arms D, which have eyes at their outer ends to receive a rod E. The receptacle F, which comprises the gist of our invention, is made, preferably, of sheet-iron or other suitable material and has a curved bottom, as shown, which is perforated, as at F', to allow the water which enters through the top to drain through. The top of the receptacle is covered with a netting G, through the meshes of which the borers or shell-fish are designed to pass as they are raked up with the oysters and pass over said screen. Shoes H pass underneath said receptacle, and the ends of said shoes are bent to form eyes $h$, in which the rods E and E' on the opposite parallel edges of the top of the receptacle are mounted. The outer free edge of the receptacle is extended over the top of the same a short distance, as shown at K in Figs. 1 and 2 of the drawings, forming a pocket to retain the borers or shell-fish when the dredge is drawn vertically out of the water. In order to regulate the angle at which it is desired to have the receptacle held with reference to the dredge, chains L are provided, which are connected to the eyes at the ends of the receptacle and fastened to the bowed portion of the dredge, as at M.

On the opposite ends of the rod E are pivoted the end-gates N, which have a curved outline corresponding to the cross-section of the receptacle, and at the free swinging end of each gate is an eye N', which when the said gate or door is closed will register with the eye Q in the end shoe passing underneath the said receptacle, and in order to lock the gate or door closed a key-bolt or any other suitable fastening may be passed through said registering apertures.

The operation of our invention will be clearly understood. As the dredge is drawn through the water with the rake-teeth underneath the oysters both oysters and borers or shell-fish, which are the enemies of the oysters and for the capture of which the present invention is intended, are raked up onto the wire-netting covering the receptacle, the mesh of said netting being of small size to allow the shell-fish to pass through into the receptacle, while the oysters are caught in the wire basket which projects beyond the rear end of the receptacle.

As the dredge is hoisted vertically it will be observed that the projecting portion K of the receptacle will be held vertically and prevent the shell-fish from falling through the netting, and after the receptacle has been removed from the water the end-gates may be raised and the contents of the receptacles emptied.

Having thus described our invention, what we claim to be new, and desire to secure by Letters Patent, is—

1. An attachment for oyster-dredges comprising a receptacle hinged to an oyster-dredge and provided with a screen top and solid perforated bottom having one of its longitudinal edges projecting a short distance over the top of the receptacle as set forth.

2. An attachment for oyster-dredges, comprising a receptacle having a solid bottom which is perforated, one longitudinal edge of the receptacle extending over the top thereof, a screen covering the balance of the receptacle, the latter being hinged to the dredge and adjustable chain connections between the outer free edge of the receptacle and the dredge, as set forth.

3. In combination with an oyster-dredge, a receptacle having shoes fastened to the under surface thereof, said receptacle having a curved bottom, eyes formed at the ends of said shoes, a rod carried in said eyes, and rigid arms carried by the dredge and having eyes which are journaled on said rod, and adjustable chain connections between the eyes at the outer longitudinal ends of the receptacle, and the oyster-dredge, as set forth.

4. In an attachment for use upon oyster-dredges, a receptacle (of sheet-iron or other metal,) having a solid bottom and sides which are curved, said receptacle hinged to the dredge and having vertical swinging gates or doors at each end of said receptacle, as shown and described.

5. In combination with an oyster-dredge, the rigid arms secured to the rake-plate, the receptacle made of metal and having perforations at its bottom, the shoes fastened to the under surface of said receptacle, eyes formed at the ends of said shoes, the rods passing through said eyes, and the eyes at the ends of said rigid arms, the swinging doors having eyes at each end, said doors being pivoted on the ends of the hinged rod, and the eyes at the opposite ends of said doors adapted to register with eyes at the outer free longitudinal ends of the receptacle, and key-bolts for holding said doors closed, as shown and described.

In testimony whereof we affix our signatures in presence of two witnesses.

LEWIS F. SHROPSHIRE.
WALTER C. RIGGIN.

Witnesses:
A. L. HOUGH,
J. M. PFEIFFER.